Nov. 18, 1969 V. H. CAMPBELL 3,479,449

COLOR TEMPERATURE STABILIZATION IN COLOR RECEIVERS

Filed Dec. 8, 1966

INVENTOR.
VICTOR H. CAMPBELL
BY
Robert E. Strauss
ATTORNEY

United States Patent Office 3,479,449
Patented Nov. 18, 1969

3,479,449

COLOR TEMPERATURE STABILIZATION IN COLOR RECEIVERS

Victor H. Campbell, Sylvan Heights, Emporium, Pa., assignor to Sylvania Electric Products Inc., a corporation of Delaware Filed Dec. 8, 1966, Ser. No. 600,182
Int. Cl. H04n 5/44
U.S. Cl. 178—5.4 6 Claims

ABSTRACT OF THE DISCLOSURE

A color temperature stabilization device wherein a plurality of demodulated signals are applied to a device having a plurality of signal input electrodes, a plurality of signal output electrodes, and a cathode common to all of the signal input and signal output electrodes.

Figures 1, 2:
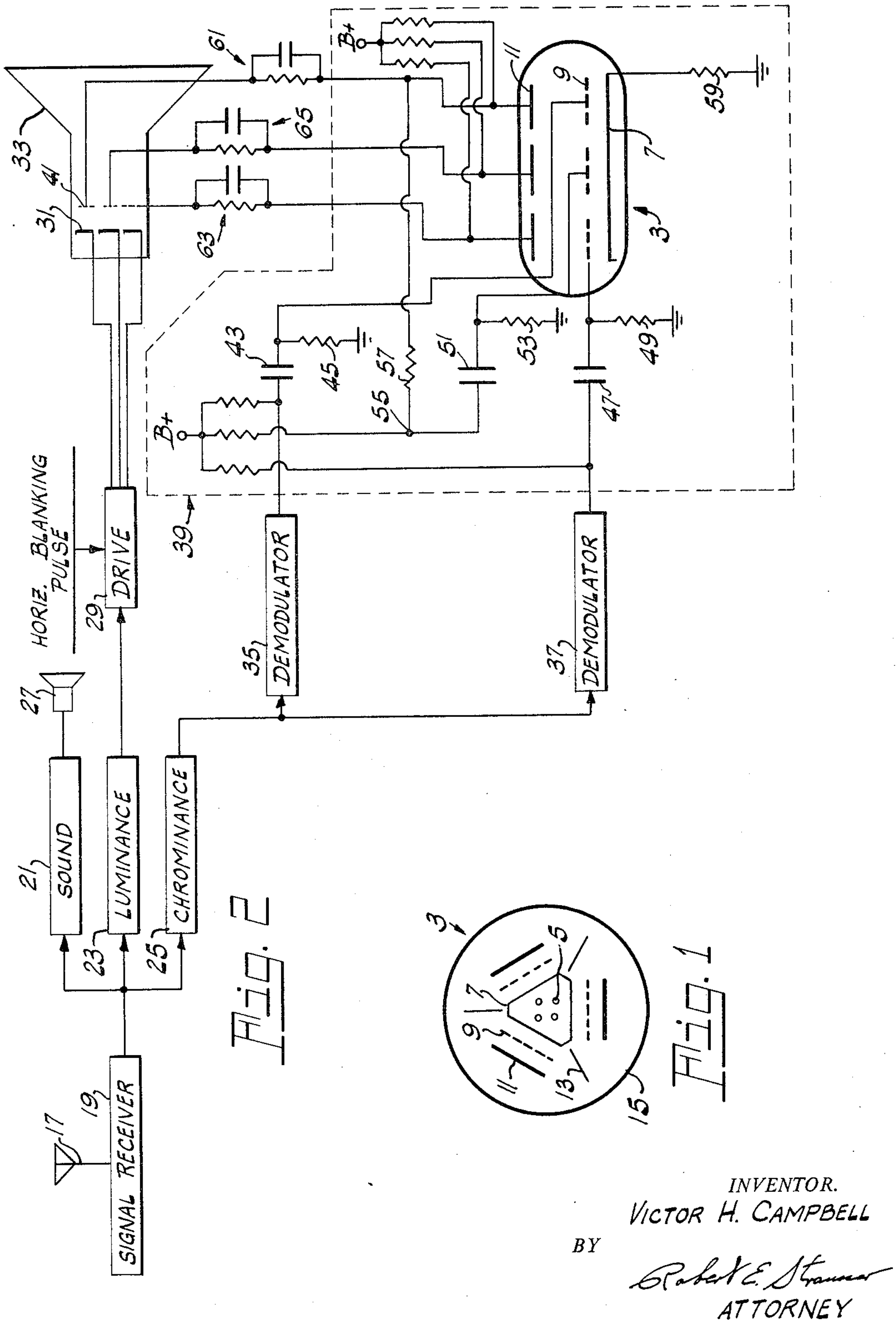

This invention relates to color television receiver apparatus and more particularly to apparatus for providing a stable ratio of amplified color difference signals which is applied to a color cathode ray tube to provide a stable color temperature.

Present-day color television receivers commonly employ a low level demodulation system wherein amplification devices are employed to increase the intensity of the signals applied to the color cathode ray tube. Frequently, these amplification devices are in the form of individual electron discharge devices or multi-section electron discharge devices wherein a separate discharge device or a separate section of a multi-section discharge device is utilized for each signal applied to a control electrode of the color cathode ray tube.

More specifically, it is common practice to provide three individual discharge devices with the cathode electrode of each of the devices coupled via a common resistor to circuit. A pair of demodulated signals, X and Z signals, are coupled to individual signal input electrodes of two of the discharge devices and current flow through the common resistor coupled to each of the cathode electrodes causes development of three color difference signal, i.e., R–Y, B–Y, and G–Y color difference signals. Thereafter, each of these color difference signals, R–Y, B–Y, and G–Y, is amplified by one of the discharge devices and coupled by way of a signal output electrode to an individual signal input electrode of a color cathode ray tube. Thus, a predetermined ratio of color difference signals is applied to the color cathode ray tube whereby electron flow from a plurality of electron guns is controlled to provide a designated color temperature or color observed by a viewer.

One of the problems associated with such apparatus is the maintenance of a stable ratio of color difference signals and, in turn, a stable color temperature of the color cathode ray tube such that the color observed by the viewer does not undesirably shift from the designated color. In other words, it is desirable to have the ratio of color difference signals remain stable until such time as this ratio is altered by variations in the demodulated signals applied to the amplification devices.

As mentioned above, known television receivers employ separate discharge devices or discharge devices having separate and individual sections. Also, it is known that the provision of a stable ratio of amplified signals from a plurality of individual discharge devices is impractical, if not impossible, due to the inherent inconsistencies and non-uniformity of electron discharge devices.

More specifically, it has long been known that a major cause of variations and non-uniformity of electron discharge devices is directly traceable to the cathode electrode of the discharge device. For example, it is known that the electron emissive capabilities of individual cathodes vary at differing rates when the operational temperature of the cathode is shifted. Also, it is known that each individual cathode "ages" or deteriorates with usage at a somewhat different rate even though a plurality of cathodes are included in the same multi-section device. Thus, the maintenance of a stable ratio of color difference signals from a plurality of separate cathode electrodes is most difficult.

One known form of apparatus which has attempted to compensate for the above-described undesirable variations and instability of the amplified color difference signals includes a multi-section electron discharge device having three separate cathode electrodes with each cathode electrode connected to circuit ground via a common cathode resistor. A storage capacitor and resistor are coupled to the signal input electrode of each of the sections of the discharge device and a negative-going retrace pulse at the horizontal repetition rate is applied to each of the cathode electrodes. The retrace pulse drives each of the sections of the discharge device in an amount sufficient to cause current to flow in the signal input electrode whereupon the storage capacitor of each section is charged and a bias potential developed which is dependent upon the electrical characteristics of the individual cathode electrodes in each of the sections of the discharge device.

While such stabilizing pulse techniques have been and still are used in many preseint-day television receivers, it can be readily understood that the apparatus required for such a system is rather complex. Also, the complexity of the apparatus obviously increases the fabrication cost of both the apparatus and the electron discharge device utilized therein. Moreover, discharge devices employing a plurality of individual cathode electrodes require a uniform source of energy in order to obtain a uniform operational temperature of the individual cathode electrodes and the provision and application of uniform energy to a plurality of devices again adds to the cost and complexity of the apparatus.

Therefore, it is an object of this invention to enchance the color temperature stability of a color television receiver.

Another object of the invention is to improve the color signal amplification apparatus of a color television receiver.

Still another object of the invention is to provide a stable ratio of color difference signals suitable for application to a color cathode ray tube.

A further object of the invention is to enhance the color temperature stability of a color television receiver by providing improved apparatus which includes an enhanced discharge device.

These and other objects are achieved in one aspect of the invention by a color television receiver wherein is provided a plurality of demodulated signals which are applied to a discharge device having a plurality of signal input electrodes, a plurality of signal output electrodes, and a cathode electrode common to all of the signal input and signal output electrodes. The discharge device receives a plurality of demodulated signals and provides a substantially stable ratio of amplified color difference signals which are applied to individual signal input electrodes of a color cathode ray tube.

For a better understanding of the present invention, together with other and further objects, advantages, and capabilities thereof, reference is made to the following disclosure and appended claims in connection with the accompanying drawings in which:

FIG. 1 is an electron discharge device, in cross-sectional view, illustrating the electrode structure embodied in the apparatus of the present invention; and FIG. 2 is an illustrative embodiment, in block and schematic form, of a color television receiver employing one embodiment of the invention.

Referring to the drawing, FIG. 1 is a cross-sectional view of an electron discharge device 3 particularly suitable for use in a preferred embodiment of the invention. The electron discharge device 3 includes a heating element 5 surrounded by a substantially triangular-shaped cathode structure 7.

The cathode structure 7 as well as the fabrication thereof is fully described in a concurrently filed co-pending application entitled "Cathode Sleeve Structure and Fabrication Process" assigned to the assignee of the present application. Briefly, the cathode structure 7 is formed from strip material which is butt-seam welded and shaped into a substantially triangular configuration with each of the three sides of the triangle having a substantially similar area. Also, a layer of potentially emissive material is affixed to each of the three substantially similar areas to provide three substantially identical cathodes. Moreover, each of the three substantially identical cathodes has a substantially similar electron emmissive capability and the heater element 5 serves as a common energy source for all of the cathodes.

Also, an individual signal input or control electrode 9 is disposed in a plane spaced from and substantially parallel to each of the three sides of the triangular-shaped cathode structure 7. In a similar manner, an individual signal output or anode electrode 11 is disposed in a plane spaced from and substantially parallel to each of the three sides of the shaped cathode structure 7. Further, an electron shield 13, preferably but not necessarily, may be disposed intermediate each adjacent pair of signal input and output electrodes, 9 and 11 respectively, to provide electrical isolation therebetween.

Additionally, the common cathode structure 7, common heater element 5, individual signal input or control electrodes 9, individual signal output or anodes 11, and individual electron shields 13 are supported and contained within an evacuated envelope 15 in a manner well known in the art of fabricating electron discharge devices. Moreover, each of the above-listed elements is electrically available exterior to the evacuated envelope 15.

Since the electron discharge device 3 includes a heater element 5 and a cathode structure 7 which are both common to each pair of signal input and output electrodes, 9 and 11, respectively, three substantially identical amplifiers are provided. Moreover, the emissive capabilities and rate of aging or deterioration with use of each of the three amplifiers is substantially identical. Also, each of the three amplifiers is affected in substantially the same manner and at the same rate with regard to variations in cathode structure contact potential, variations in cathode structure heating temperatures, variations in line potential, and variations in cathode structure impedance between the emitting surface and the electrical lead connections thereto.

Thus, it can be readily understood that the above-described electron discharge device 3 virtually eliminates many of the variations inherent to a plurality of discharge devices and the uniformity and consistency of electrical characteristics of each of the amplifying means with respect to each other is believed to be unobtainable in any known structure.

One form of apparatus especially suited to the use of the electron discharge device 3 shown and described in connection with FIG. 1 is the color television apparatus illustrated in FIG. 2. Therein, a color television receiver includes the usual antenna 17 for intercepting transmitted color television signals and a signal receiver 19 coupled to the antenna 17. The signal receiver 19 includes the ordinary RF and IF signal amplification and detection stages and provides an output signal which is coupled to a sound channel 21, a luminance channel 23, and a chrominance channel 25.

In the usual manner, the sound channel 21 provides an audio signal which is applied to a loudspeaker 27. Also, the luminance channel 23 provides a signal, usually referred to as the Y signal, representative of the picture information viewed by a television camera which is combined with a horizontal retrace blanking pulse in a drive control network 29 and coupled to the cathodes 31 of a color cathode ray tube 33.

The chrominance channel 25 provides a chrominance signal by way of the well-known bandpass amplifier stage, synchronizing circuitry, burst amplifier and keyer stage, local oscillator stage, and color killer stage. This chrominance signal of varying amplitude and phase is applied to first and second synchronous demodulation stages 35 and 37 respectively, wherefrom are provided first and second demodulated signals, usually represented as X and Z signals, which are applied to a stabilized signal amplification apparatus 39.

The amplification apparatus 39 responds to the first and second demodulated signals X and Z, to develop three color difference signals, usually referred to as R–Y, B–Y, and G–Y signals, which are intensified and individually coupled to a separate one of the signal control electrodes 41 of the color cathode ray tube 33. In the color cathode ray tube 33, each of the color difference signals, R–Y, B–Y, and G–Y, is combined with the luminance signal, Y applied to the cathodes 31 to provide information representative of the colors viewed by a color television camera, i.e., red, blue, and green.

Referring back to the signal amplification apparatus 39, it can be readily understood that a prime requisite thereof is to not only develop and amplify a desired ratio of color difference signals but also to maintain the color difference signal ratio in a stable condition to prevent any undesired color temperature shift in the color cathode ray tube 33. In this light, the discharge device 3 previously described and illustrated in FIG. 1 is especially designed for use in the amplification apparatus 39.

In the particular embodiment illustrated in FIG. 2, a demodulated signal, X-signal, is coupled from the first demodulation stage 35 to a first signal input electrode 9 of the discharge device 3 via a capacitor 43 and a resistor 45 connected to a voltage reference level. Similarly, a demodulated signal, Z-signal, is coupled from the second demodulation stage 37 to a second signal input electrode 9 of the discharge device 3 via a capacitor 47 and a resistor 49 connected to a voltage reference level. The third signal input electrode 9 of the discharge device 3 is coupled to a voltage source B+ via a capacitor 51 and a resistor 53 connected to a voltage reference level. Also, a junction 55 of the voltage source B+ and capacitor 51 is coupled via a resistor 57 to a first signal output electrode 11 of the discharge device 3 for purposes to be explained hereinafter.

The cathode electrode 7 which is common to all of the signal input electrodes 9 and signal output electrodes 11 is coupled via a resistor 59 to a voltage reference level such as circuit ground. Further, each of the first, second, and third signal output electrodes 11 of the discharge device is coupled to a voltage source B+ and via a parallel connected resistor and capacitor network, 61, 63, and 65 respectively, to an individual signal input electrode 41 of the color cathode ray tube 33.

In operation, the first and second demodulated signals, X and Z signals, are applied to individual signal input electrodes 9 of the electron discharge device 3. Thereupon, current flow through the resistor 59, common to all of the signal input and signal output electrodes, 9 and 11 respectively, causes development of three color difference signals usually represented as R–Y, B–Y, and G–Y signals.

Each of the three color difference signals, R–Y, B–Y, and G–Y, in amplified form appears at one of the signals output electrodes 11 of the discharge device 3 and is coupled via a resistor and capacitor network, 61, 63, and 65 respectively, to an individual signal input electrode 41 of the color cathode ray tube 33. Also, a portion of one of the color difference signals, usually the R–Y color difference signal, is coupled to the signal input electrode 9 of the discharge device 3 whereto a demodulated signal has not been applied. In this manner, R–Y and B–Y color difference signals are provided in proportions and phases such that the amplified G–Y color difference signal available at the signal output electrode 11 is of the desired phase and magnitude.

It should perhaps be mentioned that the above-described compensation of the G–Y color difference signal is accomplished by way of the series connected resistor 57 and capacitor 51 coupling one of the signal output electrodes 11 to one of the signal input electrodes 9 of the discharge device 3. Also, it should perhaps be noted that a D.C. restoration means (not shown) such as a diode, for example, may be, not necessarily need be, coupled in shunt with each one of the resistors 45 and 49 coupled in circuit with the signal input electrode 9 whereat each of the demodulated signals, X and Z signals, is applied.

It is apparent that enhanced color temperature stabilization of the color television circuitry is dependent upon the enhanced electron discharge device utilized to amplify all three of the color difference signals. Further, the cathode structure which is common to the amplification of all three of these color difference signals has a uniformity of electron emissive capability and rate of deterioration with use which is believed to be unobtainable with any known similar device. Also, any variation in energy applied to the amplification device for all three color difference signals is of a uniform amount due to the utilization of a common cathode structure as well as a heater common to the structure. Moreover, the uniformity of color temperature and freedom from color temperature drift of the color television receiver is believed to be unobtainable with any prior known circuitry employing amplifying means of the electron discharge device type.

While there has been shown and described what is at present considered the preferred embodiment of the invention, it will be obvious to those skilled in the art that various changes and modifications may be made therein without departing from the invention as defined by the appended claims.

What is claimed is:

1. In a color television receiver adapted to receive color television signals, apparatus for providing a stable ratio of color difference signals for a cathode ray tube having a plurality of individual signal input electrodes comprising in combination:

an electron discharge device having a plurality of individual signal input electrodes, a plurality of individual signal output electrodes, and a cathode electrode, to all input and output electrodes;

a plurality of demodulated signal sources;

means for coupling each of said demodulated signal sources to an individual input electrode of said discharge device;

means for coupling said common cathode electrode to a voltage reference level, said means including an impedance connected intermediate said cathode electrode and said voltage reference level; and means for coupling a color difference signal from each individual output electrode of said discharge device to an individual signal input electrode of a color cathode ray tube, said color difference signal having a ratio which remains substantially constant for variations in electrical characteristics of said common cathode electrode whereby the color temperature of said color cathode ray tube remains substantially stable despite variations in the electrical characteristics and operation temperature of said common cathode electrode of said discharge device.

2. The apparatus of claim 1 wherein said electron discharge device includes three individual signal input electrodes and three individual signal output electrodes and said plurality of demodulated signal sources includes three individual color difference signal sources.

3. The apparatus of claim 1 wherein said electron discharge device includes three individual signal input electrodes and three individual signal output electrodes and said plurality of demodulated signal sources includes a first and a second demodulated signal source.

4. The apparatus of claim 1 wherein said impedance coupling said common cathode to a voltage reference level is in the form of a fixed resistor.

5. The apparatus of claim 3 wherein said means for coupling each of said demodulated signals to an individual input electrode of said discharge device includes resistor coupling each of said individual signal input electrodes to a voltage reference level and a capacitor coupling the junction of said resistor and said signal input electrode to a demodulated signal source.

6. The apparatus of claim 3 including means for coupling a color difference signal from the one signal output electrode to a third signal input electrode of said electron discharge device.

References Cited

UNITED STATES PATENTS

| | | | |
|---|---|---|---|
| 2,954,426 | 9/1960 | Kroger | 178—5.4 |
| 2,955,152 | 10/1960 | Keizer | 178—5.4 |
| 3,135,824 | 6/1964 | Boothroyd | 178—5.4 |
| 3,301,945 | 1/1967 | Dietch | 178—5.4 |
| 3,324,236 | 6/1967 | Dietch et al. | 178—5.4 |

ROBERT L. GRIFFIN, Primary Examiner

J. C. MARTIN, Assistant Examiner

U.S. Cl. X.R.

313—303, 307

PO-1050
(5/69)

UNITED STATES PATENT OFFICE
CERTIFICATE OF CORRECTION

Patent No. 3,479,449 Dated 11/18/69

Inventor(s) Victor H. Campbell

It is certified that error appears in the above-identified patent and that said Letters Patent are hereby corrected as shown below:

Column 1, line 39 of the specification "circuit." should read--circuit ground.--.

Column 5, Claim 1, line 57 "electrode, to" should read--electrode common to--.

SIGNED AND SEALED
FEB 24 1970

(SEAL)
Attest:

Edward M. Fletcher, Jr.
Attesting Officer

WILLIAM E. SCHUYLER, JR.
Commissioner of Patents